United States Patent
Schinkowsky (10) Patent No.: US 9,580,946 B2
(45) Date of Patent: Feb. 28, 2017

(54) SCREW CONVEYOR HAVING LINKED LATCH CLOSURE

(71) Applicant: Formax, Inc., Mokena, IL (US)

(72) Inventor: Kyle Schinkowsky, Genoa City, WI (US)

(73) Assignee: Provisur Technologies, Inc., Chicago, IL (US)

( * ) Notice: Subject to any disclaimer, the term of this patent is extended or adjusted under 35 U.S.C. 154(b) by 0 days.

(21) Appl. No.: 14/805,894

(22) Filed: Jul. 22, 2015

(65) Prior Publication Data
US 2017/0022739 A1    Jan. 26, 2017

(51) Int. Cl.
*B65G 33/24* (2006.01)
*E05C 19/12* (2006.01)

(52) U.S. Cl.
CPC .............. *E05C 19/12* (2013.01); *B65G 33/24* (2013.01)

(58) Field of Classification Search
CPC ........ B65G 33/24; B65G 21/08; B65G 33/02; B65G 33/08; B65G 53/48; E05C 19/12; E05C 9/02; E05C 19/10; E05C 9/1875; C10B 7/10; B65D 51/00; Y10T 292/081; Y10T 292/0911; Y10T 292/0939; Y10T 292/0937; Y10T 292/0938; Y10T 292/094
USPC .................................... 198/860.3–860.5, 657
See application file for complete search history.

(56) References Cited

U.S. PATENT DOCUMENTS

| 335,960 | A | | 2/1886 | Reaser et al. | |
|---|---|---|---|---|---|
| 2,667,988 | A | | 2/1954 | Bax | |
| 3,878,936 | A | * | 4/1975 | Niggemyer | B65G 21/08 198/860.2 |
| 4,090,604 | A | * | 5/1978 | Reifert | B65D 90/54 198/657 |
| 4,454,943 | A | * | 6/1984 | Moller | B65G 33/24 198/657 |
| 4,471,868 | A | * | 9/1984 | Buschbom | B65G 19/14 198/735.4 |
| 4,700,827 | A | * | 10/1987 | Haaser | B65G 27/08 198/771 |
| 5,360,505 | A | | 11/1994 | Schulz et al. | |

(Continued)

OTHER PUBLICATIONS

International Search Report for corresponding International Patent Application No. PCT/US15/46474 mailed Dec. 17, 2015.

(Continued)

*Primary Examiner* — Mark A Deuble
(74) *Attorney, Agent, or Firm* — Klintworth & Rozenblat IP LLC (57) ABSTRACT

A conveyor includes a container and a cover. A plurality of upper latches each include an upper hook. A plurality of lower latches each include a lower hook. A plurality of brackets are fixedly attached to the container and are disposed along the container, where each bracket is configured to pivotally support each lower latch at a pivot point. A rigid linkage member couples the body portion of each lower latch. Urging in a first direction at any point along linkage member causes each lower hook to simultaneously disengage from the upper hook to unlock the cover. The pivot point is arranged such that the weight of the body portion and the linkage member cause the lower hooks to be urged against the upper hooks to lock the cover to the container, in the absence of a force applied to the linkage member in the first direction.

17 Claims, 8 Drawing Sheets

(56) References Cited

U.S. PATENT DOCUMENTS

| | | |
|---|---|---|
| 2002/0056296 A1 | 5/2002 | Weinerman et al. |
| 2002/0113106 A1 | 8/2002 | Cheney |
| 2006/0169284 A1 | 8/2006 | Meyer et al. |
| 2010/0254796 A1 | 10/2010 | Bennett et al. |
| 2016/0145917 A1* | 5/2016 | Kim .................... E05B 65/0042 312/405 |

OTHER PUBLICATIONS

Written Opinion for corresponding International Patent Application No. PCT/US15/46474 mailed Dec. 17, 2015.

* cited by examiner

SCREW CONVEYOR HAVING LINKED LATCH CLOSURE

BACKGROUND

1. Technical Field

The present disclosure relates generally to a latching mechanism used in coverings for screw conveyor systems.

2. Background

Screw conveyor systems are often used in the food processing industry to move food products, such as meat products, along an enclosed pathway from either an initial loading point or a first food processing machine, to a destination point or a second food processing machine. The screw conveyor system includes a box or container, having a cover, and a screw or auger located toward the bottom of the container and arranged along the length of the container. Food product entering the input end of the container is transported along the length of the container as the screw rotates, and exits the output end of the container. The cover prevents the food product from being forced out of the container, and also facilitates sanitary handling of the food product and compliance with industrial safety regulations.

Food processing personnel must often open the cover of the container to perform various operations, such as inspecting the conveying process, verifying proper operation and movement of the food product, adding ingredients, and periodically cleaning the device. Screw conveyor covers can be held closed in many different ways. Known covers are typically not sufficiently stiff to remain tightly closed along their entire length with only a single latch. Accordingly, some known conveyors use a plurality of latches disposed along the length of the cover. In such systems, each latch must be disengaged separately to open the cover. Frequently, one or more of these latches can be difficult to access because there may be external objects that impede easy and convenient access to the latches, thus more time and effort is needed to perform the basic operation of opening the cover. Other known latches require a moderate amount of force to release, such as "cam-over" latches or "vise-grip" type latches.

SUMMARY

In one embodiment, multiple latches are disposed along the length of the cover as part of a single integrated structure that facilitates opening the cover from any convenient location along its length, without having to manually disengage each latch separately. The plurality of latches, in one embodiment, are designed with a hook type interface that locks the cover to the opening of the container. In one specific embodiment, the center of gravity of the linked latches is offset so as to retain the latches in a "down" or locked position, which permits the cover to remain locked when no external force is applied to the mechanism. The latches are also easily engaged by simply closing the cover. The latches have a hook type interface that locks the hooks together when the cover is closed.

In another embodiment, a screw-type conveyor includes one or more containers, each having an open portion and a cover configured to cover the open portion. A plurality of upper latches are disposed in a spaced relation along a length of the cover, where each upper latch has an upper hook. Similarly, a plurality of lower latches are disposed in a spaced relation along a length of the container, where each lower latch has a lower hook, a body portion, and a pivot point disposed between the lower hook and the body portion. A plurality of brackets are fixedly attached to the container and are disposed in a spaced relation along the length of the container, where each bracket is configured to pivotally support the corresponding lower latch at the pivot point. A rigid linkage member couples the body portion of each lower latch. Urging in a first direction at any point along linkage member causes each lower hook to simultaneously disengage from the upper hook so as to unlock the cover from the container. Conversely, the pivot point is arranged such that a weight of the body portion and the linkage member cause the lower hook to be urged against the upper hook and engage the upper hook to lock the cover to the container, in the absence of a force applied to the linkage member in the first direction.

BRIEF DESCRIPTION OF THE DRAWINGS

The system may be better understood with reference to the following drawings and the description. The components in the figures are not necessarily to scale, emphasis instead being placed upon illustrating the principles disclosed. Moreover, in the figures, like-referenced numerals designate corresponding parts throughout the different views.

DETAILED DESCRIPTION

Figure 1:
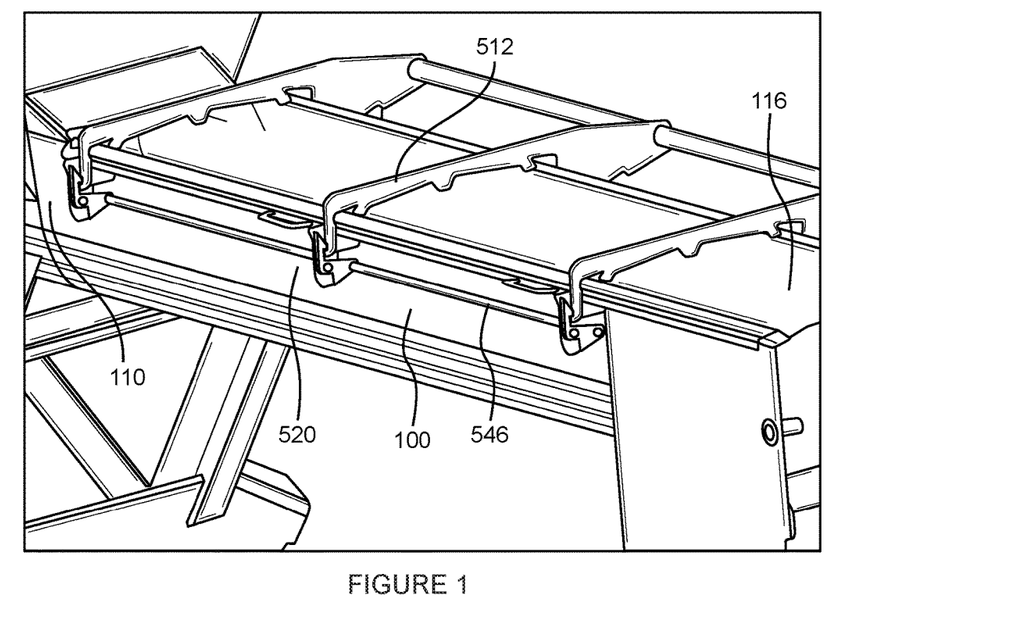
FIG. 1 is a perspective view of a container segment of a screw conveyor and latching mechanism according to one embodiment.
Figure 2:
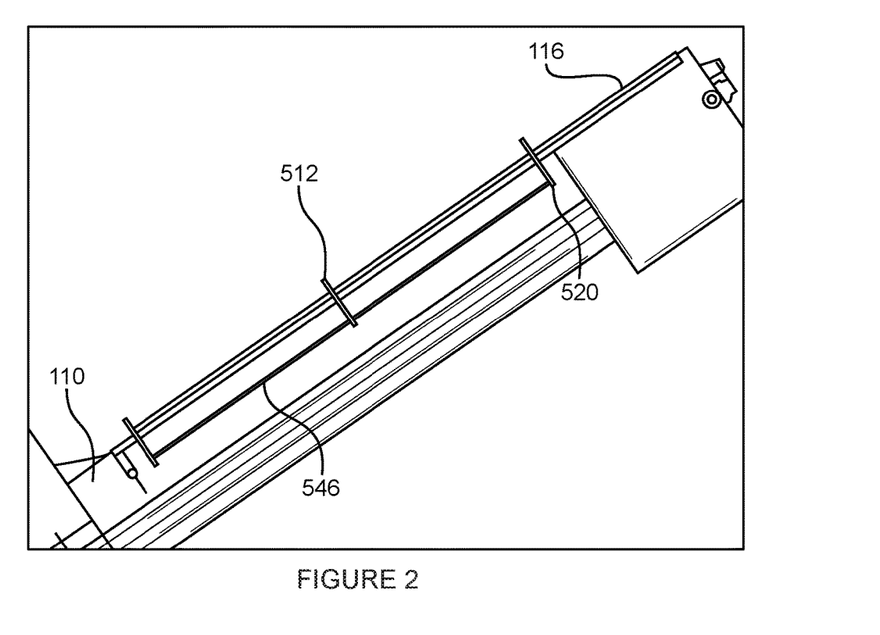
FIG. 2 is a side elevational view of the screw conveyor of FIG. 1.

Referring to FIGS. 1 and 2, FIG. 1 illustrates a single container segment 100 of a screw-type conveyor 110, while FIG. 2 illustrates screw-type conveyor 110 inclined at an operational angle. The conveyor 110 may operate from the horizontal position to a near vertical position. Typically, the conveyor 110 may be about 3 feet to 20 feet in length, and a maximum length of each separate container segment 100 may be about 9 feet. Multiple container segments may be concatenated. However, any suitable segment length may be used, and the length of the entire conveyer 110 may be greater than 20 feet depending upon the application.

Figure 3:
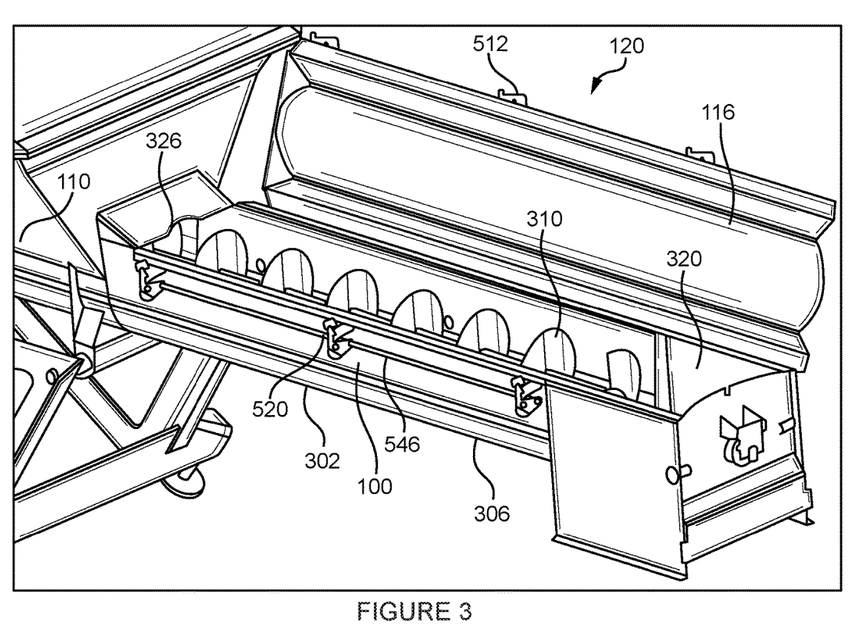
FIG. 3 is a perspective view of the container segment of FIG. 1 showing the screw conveyor and cover in an open position.
Figure 4:
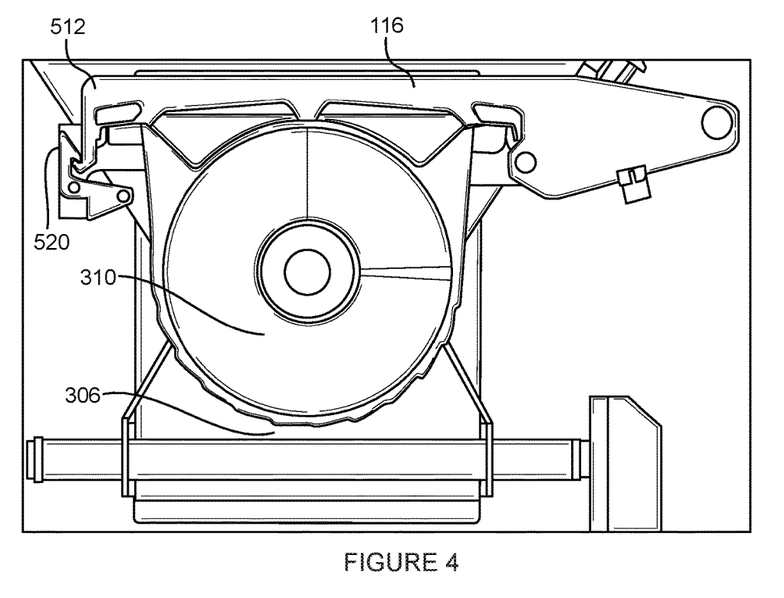
FIG. 4 is a side view of the latching mechanism of the screw conveyor of FIG. 1, showing the cover in a closed position, according to one embodiment.

Referring now to FIGS. 3 and 4, FIG. 3 shows a container segment 100 of the screw conveyor 110 with a cover 116 shown in an open position. FIG. 4 shows the container segment 100 of the screw conveyor 110 with the cover 116 in a closed position. Each container segment 100 includes a container 120 or other suitable enclosure, and the corresponding cover 116. As more clearly shown in FIG. 3, the container 120 has a bottom portion 302 and a trough 306 formed in a bottom portion 302 of the container 120. A transport screw 310 or auger may be disposed in the trough 306 of the container 120, which may extend along a length of the container 120. Rotational power to the transport screw 310 is provided by a motor (not shown). In operation, food product, such as meat for example, may be loaded at an input end 320 of the container. Food product deposited at the input end 320 of the container is transported along the length of the container 120 as the screw 310 rotates, and exits an output end 326 of the container 120. The cover 116 prevents the food product from being inadvertently forced out of the container 120, and also facilitates sanitary handling of the food product and compliance with industrial safety regulations.

Figure 5:
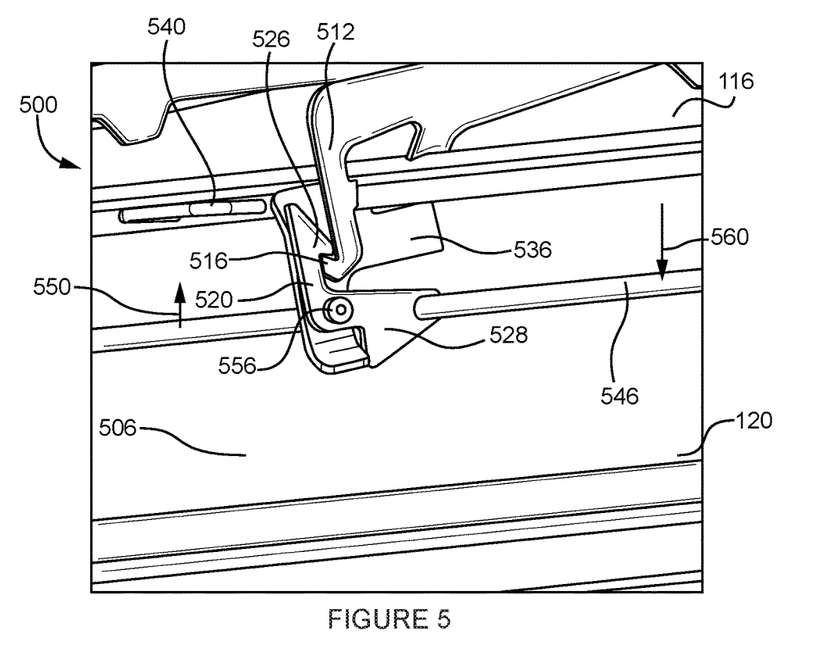
FIG. 5 is an enlarged perspective view of the latching mechanism, according to one embodiment.
Figure 6:
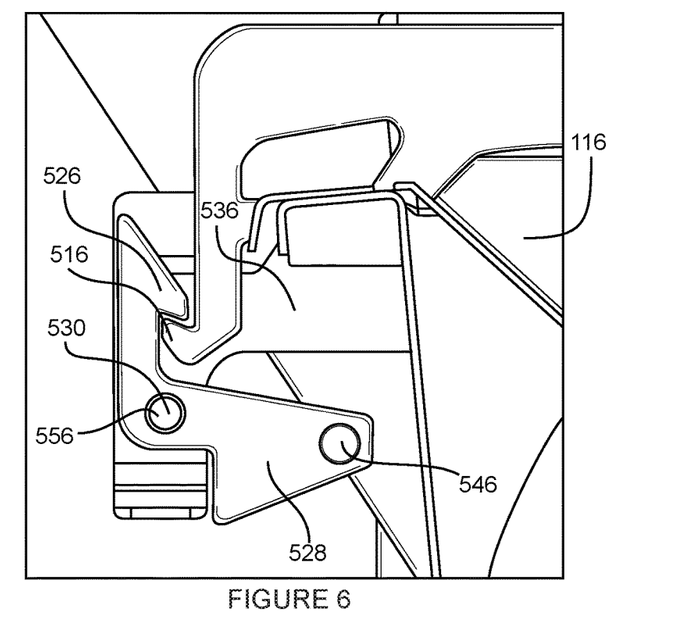
FIG. 6 is an enlarged side view of the latching mechanism, according to one embodiment.

FIGS. 5 and 6 show a latching mechanism 500 in greater detail. Portions of the latching mechanism 500 may be disposed on both a side wall 506 of the container 120 and the cover 116 of the container 120 to facilitate locking the cover 116 to the container 120 and unlocking the cover 116 from the container 120. The latching mechanism 500 may include a plurality of upper latches 512 disposed in a spaced relation along a length of the cover 116, where each upper latch 512 may have an upper hook 516. For purposes of clarity, only three of the upper latches 512 are shown in the figures, but any suitable number of such latches maybe used for each container segment 100, depending on the length of the container. Generally, the longer the container 120, the more latches 512 are needed to adequately secure the cover 116. Similarly, a plurality of lower latches 520 may be disposed in a spaced relation along the length of the container 120, where each lower latch 520 may have a lower hook 526, a body portion 528, and a pivot point 530 disposed between the lower hook 526 and the body portion 528. The number of upper latches 512 are preferably equal to the number of lower latches 520 for a one-to-one correspondence.

Further, a plurality of brackets 536 may be fixedly attached to the container 120 and may be disposed in a spaced relation along the length of the container 120. Such spacing between the brackets 536 may be equal or unequal depending on positional, functional, and aesthetic considerations. The brackets 536 may be fixed to the container 120 by known methods, such as by welds, screws, nuts and bolts, rivets, or other suitable fasteners. Preferably, each bracket 536 may pivotally support a corresponding lower latch 520 a pivot point 530. A handle 544 affixed to the cover permits the cover 116 to be manually lifted when the latching mechanism 500 is disengaged.

A rigid linkage member 546 or rod may fixedly couple the body portion 528 of each lower latch 520 and may extend from lower latch to lower latch and across all lower latches 520. As may be clearly understood viewing the arrangement of FIG. 5, urging the linkage member 546 in a first direction, such as in an upward direction at any point along the length of linkage member 546, as shown by the upwardly directed arrow 550, will cause the lower hooks 526 to simultaneously rotate about the pivot point 530 and simultaneously disengage from the upper hooks 516 so as to unlock the cover 116 from the container 120 and permit manual (or spring-loaded assist) raising of the cover 116.

Each lower latch 520 may pivot about the pivot point 530 and may be supported by the bracket 536. The lower latches 520 may be attached to the corresponding bracket 536 with a suitable fastener 556 received though an aperture in the lower latch 520 and bracket 536, such as by a nut and bolt, or any suitable fastener that permits the lower latch 520 to rotate freely relative to the bracket 536. Further, the pivot point 530 is arranged such that the weight of the body portion 528 and the linkage member 546 cause the lower hooks 526 to be urged against the upper hooks 516 and engage the upper hooks to lock the cover 116 to the container 120 in the absence of a force applied to the linkage member 546 in the first direction 550. Essentially, the configuration of the metal components are weighted in a specific direction relative the pivot point 530 so that the latching mechanism 500 tends to rotate clockwise into the locking position absent an external force applied to the latching mechanism 500.

As shown in FIGS. 5-6, a downwardly directed arrow 560 shows the affect of gravity on the position of the lower latches 520 due to the weight distribution of the lower latches 520 and the linkage member 546, in conjunction with the center of gravity of the lower latches 520.

Figure 7:
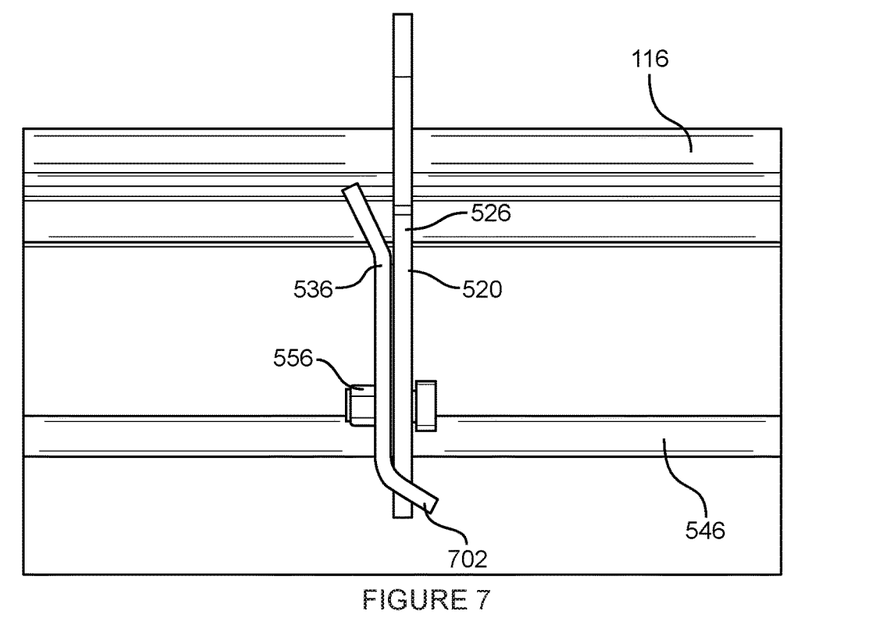
FIG. 7 is head-on elevational view of the latching mechanism, according to one embodiment.

FIGS. 5-7 illustrates a stop or projection 702 disposed on a portion of the bracket 536, formed, in one embodiment, as a bent portion of the bracket 536 extending out of a plane of the bracket 536, and configured to contact a portion of the body portion 528. The stop 702 prevents further rotation of the lower latches 520 about the pivot point 530 when rotating toward the closed and locked portion. For purposes of cost and ease of manufacturing, the stop 702 may be integrally formed with the bracket 526, but alternatively may be a separate component affixed to the bracket 536.

Figure 8:
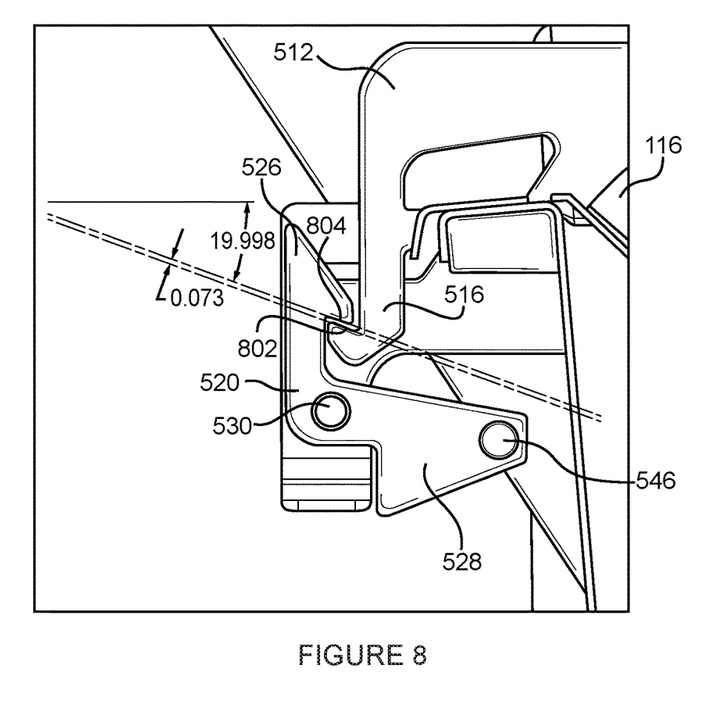
FIG. 8 is an enlarged side view of the latching mechanism showing certain angular relationships of surfaces of the hooks, according to one embodiment.

As shown in FIG. 8, the upper hook 516 includes an engagement surface 802 disposed at a predetermined angle. Similarly, the lower hook 526 includes a corresponding engagement surface 804 disposed at substantially the same angle. The angle shown relative to horizontal is preferably about 20 degrees but may range from about 15 degrees about 25 degrees.

Note that in some embodiments, the latch mechanism 500 does not exert any positive pressure on the cover 116, assuming no food product inside the container 120 is pushing against the cover. Accordingly, the cover 116 does not need to seal tightly or be hermetically sealed because most of the food products being conveyed is usually fairly large in size and cannot escape a small gap between the cover 116 and the container 120. In other words, the chamber formed by the container 120 is not "pressurized" in any way. In one specific example, if the angle of 20 degrees shown in FIG. 8 between the hook engagement surfaces 802, 804 is maintained, then a gap of about 5/64 inch (0.075) will exist between the cover 116 in the surface edge of the container where the cover meets the container. This gap is provided so that the hooks 515, 526 of the latch will clear each other during rotation.

Of course, when passively operated, there will be no gap between the cover 116 and the top edge of the container 120, and the cover will rest positively against the container. However, internal forces within the container 120 caused occasionally by food product bumping against the inside of the cover could tend to momentarily bump the cover 116 away from the container 120 by a small distance mentioned above until the engaged upper hooks 516 prevent further upward movement of the cover 116, essentially "locking" the cover in place. The hook engagement surfaces 802, 804 may be formed at any suitable angle depending upon the acceptable small gap that would necessarily exist between the cover 116 and the container 120.

Figure 9:
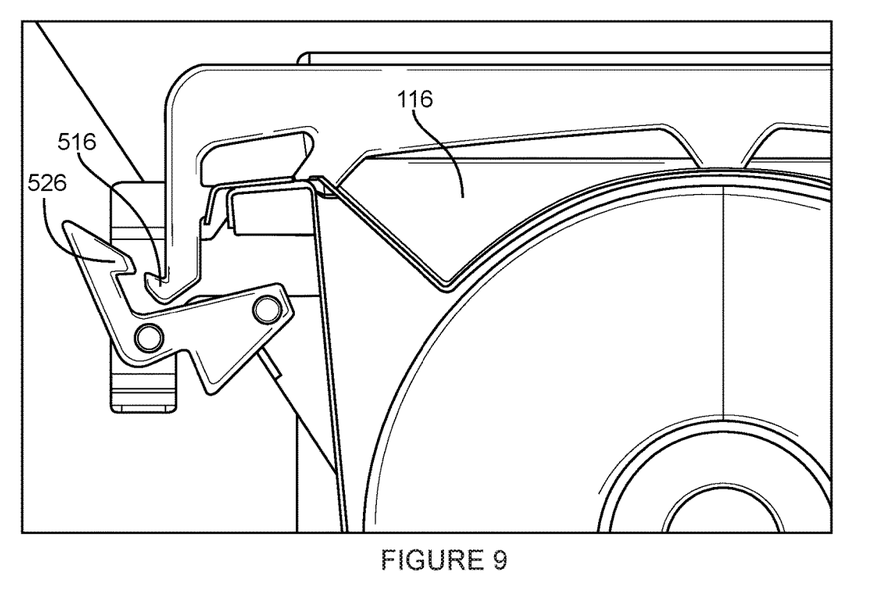
FIG. 9 illustrates an operational arrangement of opening the cover, according to one embodiment.

FIG. 9 illustrates the position of the upper latches 512 and the lower latches 520 when the cover 116 is desired to be opened. An upward force is applied to the linkage member 546 by pulling up on the linkage member. This causes the lower latches 520 to pivot in a counterclockwise direction, thus disengaging the lower hooks 526 from the upper hooks 516. The cover 116 may then be lifted by the separate handle 540 located at a convenient place on the cover 116. With the cover 116 open, the linkage member 546 may be released, and under the force of gravity, the lower latches 520 will rotate in a clockwise direction until the body 528 of the lower latches 520 contact the stop 702 disposed on the bracket 536. Such upward force may be applied by a hand of a person to the linkage member 546 in preparation for lifting the cover 116 away from the container 120. The upward force may be applied anywhere along the linkage member 546. Of course, an operator may lift up on the linkage member 546 using two hands spaced apart, but such extra effort is not needed, and the latching mechanism 500 will release regardless of where the upward force is applied along the linkage member.

Figure 10A:
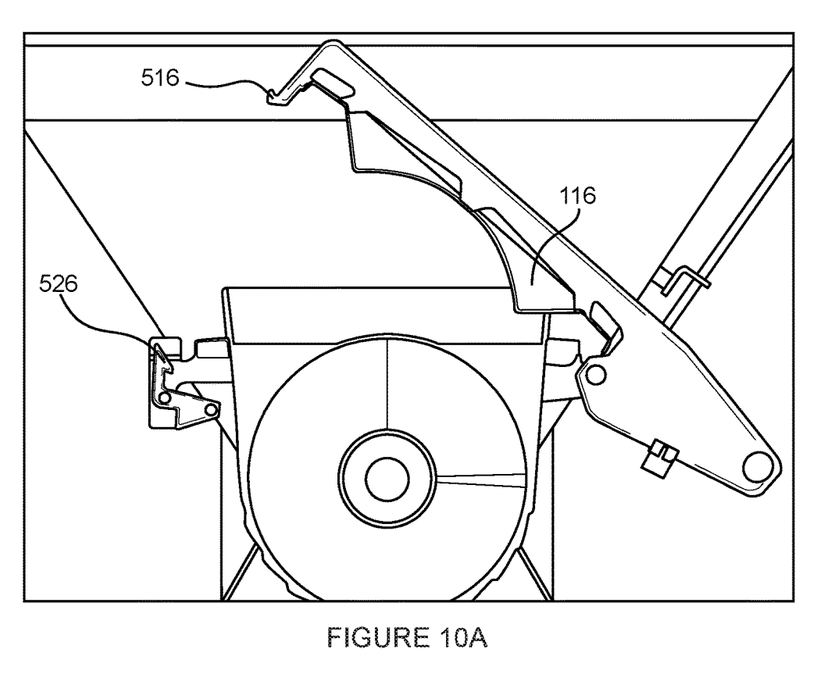
FIGS. 10A-10F illustrate an operational sequence of closing the cover, according to one embodiment.
Figure 10B:
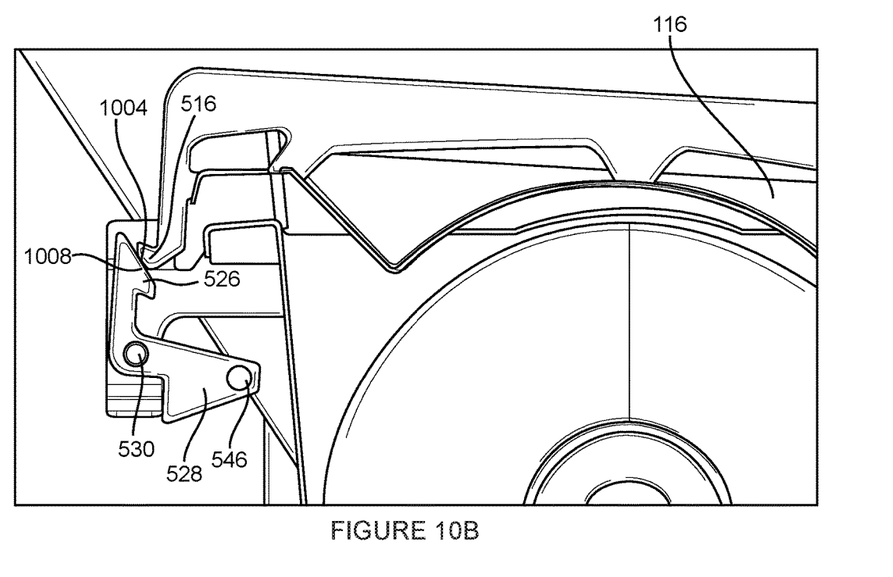
Figure 10C:
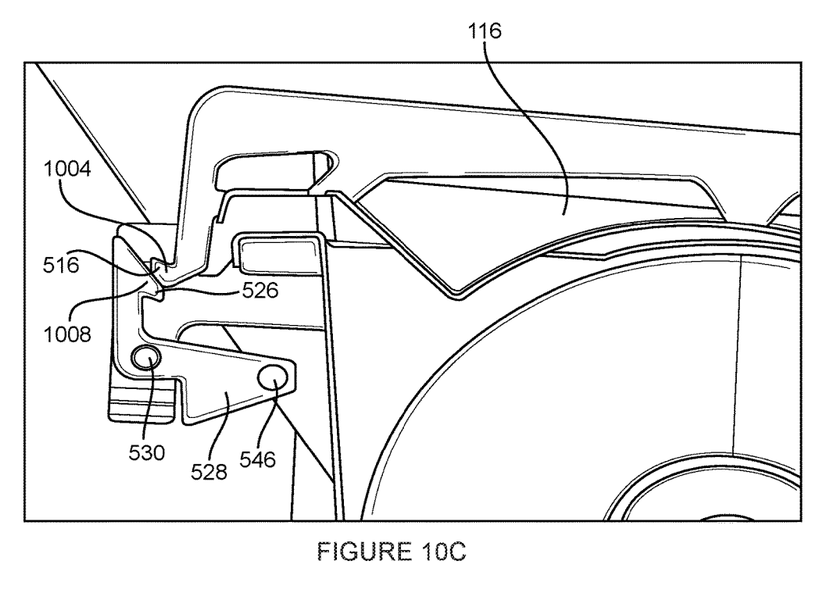
Figure 10D:
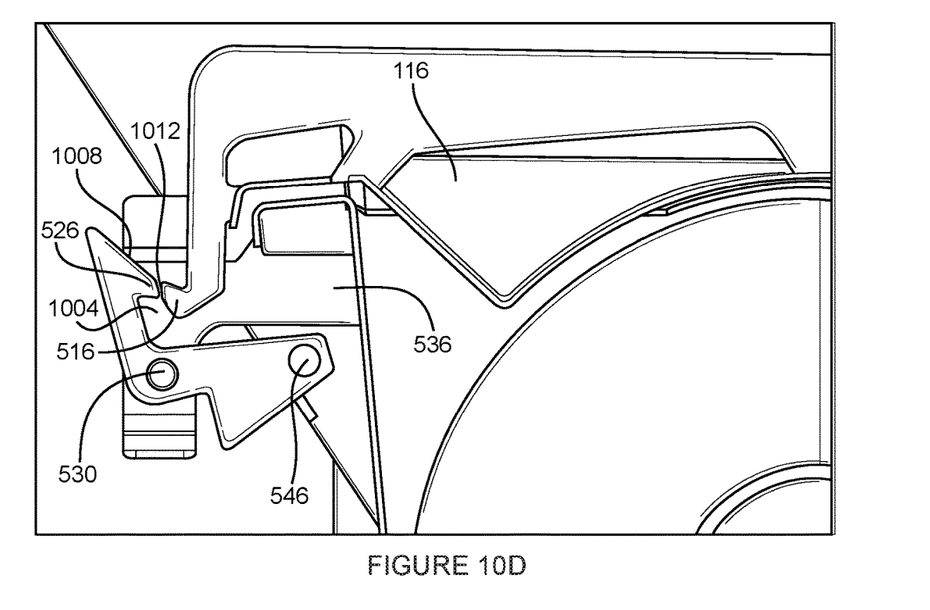
Figure 10E:
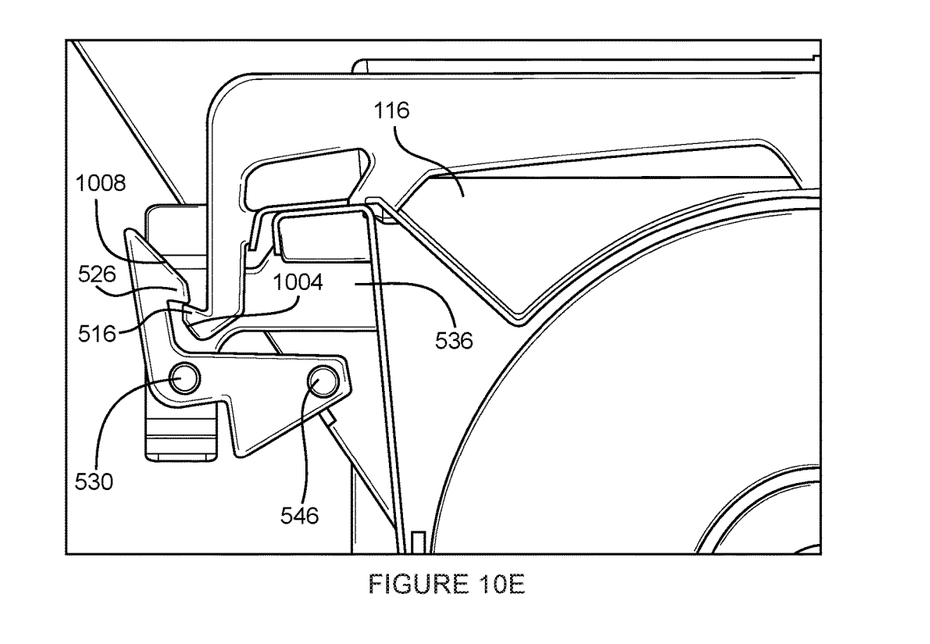
Figure 10F:
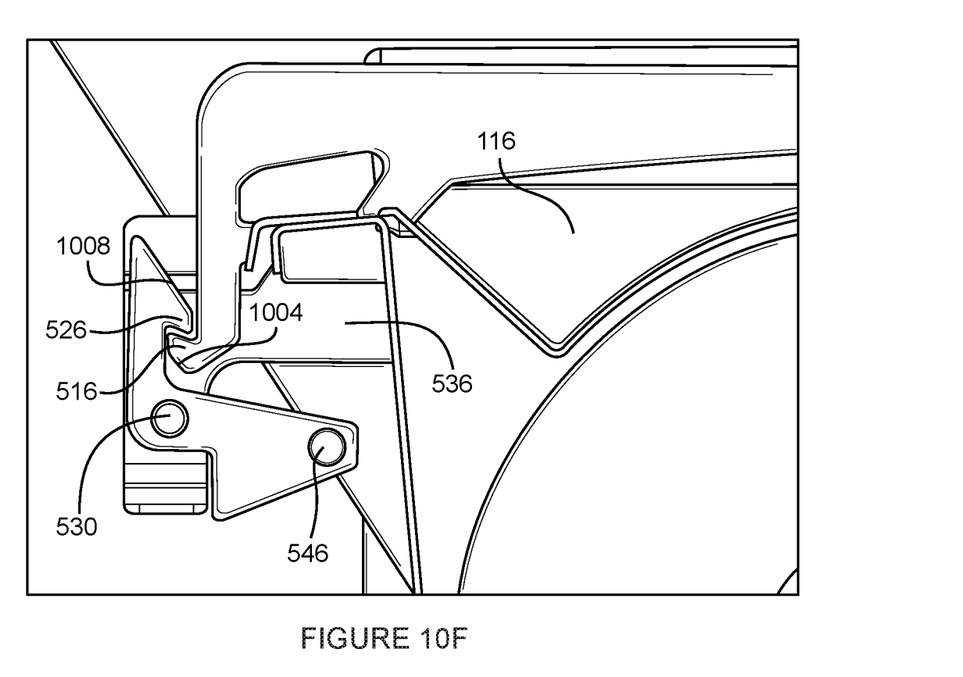

FIGS. 10A-10F, illustrate the position of the components when the cover 116 is lowered from the open position to the closed position. FIG. 10A shows the cover 116 in an open position. Consequently, the lower latches 520, under their own weight, are fully rotated in a clockwise direction with the body portions 528 resting against the stop 702 of the brackets 536. In FIG. 10B, the cover 116 is lowered and an upper or first strike surface 1004 of the upper hook 516 makes initial contact with a lower or second strike surface 1008 of the lower hook 526. Due to the angle of contact, the upper hook 516 forces the lower hook 526 to move away thus causing the lower latches 520 to pivot in the counter-clockwise direction (as viewed in the figures). In FIG. 10C, further rotation of the lower latch 520 occurs and the cover 116 is lowered as the first strike surface 1004 slides further along the second strike surface 1008. As shown in FIG. 10D, tips 1012 of the upper hook 516 and the lower hook 526 are in contact. In FIG. 10E, the tips 1012 of the hooks have passed each other, and the lower latch 520 is now able to begin clockwise rotation. FIG. 10F shows that the lower latch 520 has rotated fully in the clockwise rotation and is in the locked position.

Note that the components forming the upper latches 512 and lower latches 520 may be juxtaposed in position so that the upper latches 512, which are fixed in nature, are disposed on container, while the lower latches 520 with its pivoting action are disposed on the cover 116, and still retain the principles and features discussed herein.

For example, in such an alternate embodiment the fixed or non-moveable plurality of latches 512 may be affixed to the side of the container, while the pivoting latches 520 ganged together by the linkage member 546 may be disposed on the cover 116. In such a configuration, the linkage 546 member may function to rotate the latch out of engagement with its counterpart and also may provide a handle with which to lift the cover upwardly.

Although movement of the linkage member 546 referred to as movement in the first direction may appear to be an upward direction as shown in the drawings, however, in other embodiments, such first direction may be a downward movement depending on whether the linkage member 546 is placed forward of the pivot point 530 or backward of the pivot point along a body portion of the latch.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A latch mechanism for an auger-driven conveyor, the conveyor having a container segment, and a corresponding cover, the latch mechanism comprising:
    a plurality of upper latches disposed along a length of the cover, each upper latch having an upper hook;
    a plurality of lower latches disposed along a length of the container, each lower latch having a lower hook and a pivot point;
    a plurality of brackets configured to pivotally support respective corresponding lower latches at the pivot point;
    a linkage member coupling each lower latch, wherein the linkage member is a rigid rod coupled to a body portion of each lower latch;
    wherein urging in a first direction at any point along the linkage member causes the lower hooks to disengage from the corresponding upper hooks; and
    wherein in the absence of a force applied to the linkage member in the first direction, a weigh of the lower latch relative to the pivot point causes the lower hooks to be urged against the upper hooks and engage the upper hooks so as to lock the cover to the container.

2. The latch mechanism of claim 1, wherein the urging in the first direction along any point along the linkage member causes the lower latches to simultaneously pivot about the pivot point and causes the lower hooks to rotate out of engagement with the corresponding upper hooks.

3. The latch mechanism of claim 1, further including a stop disposed on a portion of the bracket, the stop configured to prevent further rotation of at least one lower latch about the pivot point.

4. The latch mechanism of claim 1, wherein the lower latches have an offset center of gravity so that the weight of the lower latches relative to the pivot point causes the lower hooks to be urged against the upper hooks and engage the upper hooks.

5. The latch mechanism of claim 1, wherein when moving the cover from an open position to a closed position, when contact is made between the upper hooks and the lower hooks, the upper hooks urge the lower hook away from the upper hooks causing the lower hoods to rotate about the pivot point.

6. The latch mechanism of claim 1, further comprising:
    a first strike surface disposed on each upper hook;
    a second strike surface disposed on each lower hook; and
    the second strike surface configured to approach the first strike surface along a radial path as the lower hooks pivot about the pivot point.

7. The latch mechanism of claim 6, wherein when moving the cover from an open position to a closed position, the first strike surface contacts the second strike surface and progressively and continuously causes the lower latches to rotate away from the upper latches until engagement is made, and after engagement is made, the lower latches then rotate toward the upper latches.

8. The latch mechanism of claim 1, further comprising:
    a first engagement surface disposed on the upper hooks;
    a second engagement surface disposed on the lower hooks; and
    wherein an angle of the first engagement surface is between 15 degrees and 25 degrees relative to horizontal.

9. The latch mechanism of claim 1, wherein the upper latches are fixed and non-moveable relative to the cover.

10. An auger-driven conveyor, comprising:
 a container having an open portion;
 a cover configured to cover the open portion;
 a plurality of upper latches disposed in a spaced relation along a length of the cover, each upper latch having an upper hook;
 a plurality of lower latches disposed in a spaced relation along a length of the container, each lower latch having a lower hook, a body portion, and a pivot point disposed between the lower hook and the body portion;
 a plurality of brackets fixedly attached to the container and disposed in a spaced relation along the length of the container, each bracket configured to pivotally support the corresponding lower latch at the pivot point;
 a rigid linkage member coupled to the body portion of each lower latch;
 wherein urging in a first direction at any point along linkage member causes the lower hooks to simultaneously disengage from the upper hooks so as to unlock the cover from the container; and
  wherein the pivot point is arranged such that a weight of the body portion and the linkage member causes the lower hooks to be urged against the upper hooks and engage the upper hooks to lock the cover to the container, in the absence of a force applied to the linkage member in the first direction.

11. The conveyor of claim 10, wherein the urging in the first direction along the linkage member causes the lower latches to pivot about the pivot point and causes the lower hooks to rotate out of engagement with the upper hooks.

12. The conveyor of claim 10, further including a stop disposed on a portion of the bracket, the stop preventing further rotation of at least one of the lower latches about the pivot point.

13. The conveyor of claim 10, further comprising:
 a trough formed in a bottom portion of the container;
 a transport screw disposed in the trough of the container and extending along a length of the container.

14. The conveyor of claim 10, wherein the lower latches have an offset center of gravity so that the weight of the lower latches relative to the pivot point causes the lower hooks to be urged against the upper hooks and engage the upper hooks when no force is applied to the linkage member in the first direction.

15. The conveyor of claim 10, further comprising:
 a first strike surface, disposed on the upper hooks;
 an second strike surface, disposed on the lower hooks; and
 the second strike surface configured to approach the first strike surface along a radial path as the lower hooks pivot about the pivot point.

16. The conveyor of claim 15, wherein when moving the cover from an open position to a closed position, the first strike surface contacts the second strike surface and progressively and continuously causes the lower latches to rotate away from the upper latches until engagement is reached, and after engagement is reached, the lower latches then rotate toward the upper latches.

17. The conveyor of claim 10, further comprising:
 a first angled engagement surface disposed on the upper hooks;
 a second angled engagement surface disposed on the lower hooks; and
 wherein an angle of the first engagement surface is between 15 degrees and 25 degrees relative to horizontal.

* * * * *